(12) United States Patent
Shi

(10) Patent No.: US 9,399,174 B2
(45) Date of Patent: Jul. 26, 2016

(54) APPARATUS AND METHOD FOR ELIMINATING BLIND SPOT IN AN RF ANTENNA ARRAY

(71) Applicant: Zheng Shi, Beijing (CN)

(72) Inventor: Zheng Shi, Beijing (CN)

(*) Notice: Subject to any disclaimer, the term of this patent is extended or adjusted under 35 U.S.C. 154(b) by 0 days.

(21) Appl. No.: 14/792,635

(22) Filed: Jul. 7, 2015

(65) Prior Publication Data

US 2015/0310238 A1 Oct. 29, 2015

Related U.S. Application Data

(63) Continuation-in-part of application No. PCT/CN2014/093763, filed on Dec. 12, 2014, which is a continuation-in-part of application No. PCT/CN2014/080495, filed on Jun. 23, 2014, which is a continuation-in-part of application No. PCT/CN2014/079892, filed on Jun. 13, 2014, which is a continuation-in-part of application No. PCT/CN2014/072961, filed on Mar. 6, 2014, which is a continuation-in-part of application No. PCT/CN2014/071850, filed on Jan. 30, 2014.

(51) Int. Cl.

| *H04Q 5/22* | (2006.01) |
| *A63F 13/77* | (2014.01) |
| *G06F 3/0487* | (2013.01) |
| *G06F 3/041* | (2006.01) |
| *G06K 7/10* | (2006.01) |
| *A63F 13/21* | (2014.01) |
| *A63F 13/213* | (2014.01) |

(Continued)

(52) U.S. Cl.
CPC ............... *A63F 13/77* (2014.09); *A63F 13/21* (2014.09); *A63F 13/213* (2014.09); *A63F 13/23* (2014.09); *G06F 3/044* (2013.01); *G06F 3/0416* (2013.01); *G06F 3/0421* (2013.01); *G06F 3/0428* (2013.01); *G06F 3/0487* (2013.01); *G06K 7/10356* (2013.01)

(58) Field of Classification Search
CPC .................................................. G06K 19/07749
USPC .................................. 340/572.7; 343/700 MS
See application file for complete search history.

(56) References Cited

U.S. PATENT DOCUMENTS

| 5,510,803 A | * | 4/1996 | Ishizaka ............... H01Q 21/061 343/700 MS |
| 5,659,248 A | * | 8/1997 | Hedengren ........ G01N 27/9013 324/232 |

(Continued)

FOREIGN PATENT DOCUMENTS

| EP | 2657717 A1 | 10/2013 |
| WO | WO2014139369 A1 | 9/2014 |

OTHER PUBLICATIONS

SIPO: International Search Report for PCT Application No. PCT/CN2014/093763 filed Dec. 12, 2014, dated Mar. 13, 2015.

*Primary Examiner* — Omeed Alizada

(57) ABSTRACT

The present invention provides an apparatus and method for eliminating blind spot of a high frequency RF antenna array, allowing an RFID tag to be detected when placed anywhere on top of and within the communication range of the RF antenna array. The RF antenna array includes a first array of RF antenna placed on a first surface and a second RF antenna placed on a second surface. The second RF antenna is located directly below or above the area encompassing borders of multiple antennas in the first array, but is not connected to any electrical path. Through the electromagnetic induction with the EM field generated by the first RF antenna array, a second EM field is formed by the second RF antenna, which enables detection and identification of the RFID tag placed on the blind spot of the first array of RF antenna. The present invention is useful in improving the RF communication range and accuracy of a passive RFID system.

2 Claims, 3 Drawing Sheets

(51) Int. Cl.
*A63F 13/23* (2014.01)
*G06F 3/042* (2006.01)
*G06F 3/044* (2006.01)

(56) References Cited

U.S. PATENT DOCUMENTS

2002/0018019 A1* 2/2002 Fourdeux ............. H01Q 21/065
                                                    343/700 MS
2005/0122266 A1* 6/2005 Chang ..................... H01Q 1/38
                                                    343/700 MS
2009/0189820 A1  7/2009 Saito et al.
2010/0123559 A1* 5/2010 Wilkinson ........... G06K 7/0008
                                                    340/10.4
2012/0223149 A1* 9/2012 Kato .................... H01Q 1/2216
                                                    235/492
2013/0257596 A1* 10/2013 Standish ............ G06K 7/10178
                                                    340/10.1

* cited by examiner

APPARATUS AND METHOD FOR ELIMINATING BLIND SPOT IN AN RF ANTENNA ARRAY

CROSS-REFERENCE TO RELATED APPLICATION

This application is a continuation in part of International Patent Application No. PCT/CN2014/093763, entitled "Apparatus and Method for Eliminating Blind Spot in An RF Antenna Array", filed on Dec. 12, 2014, which is a continuation in part of International Patent Application No. PCT/CN2014/080495, entitled "System and Method to Recognize an Object's ID, Orientation and Location Relative to an Interactive Surface", filed on Jun. 23, 2014, which is a continuation in part of International Patent Application No. PCT/CN2014/079892, entitled "System and Method for Identifying an Object's ID and Location Relative to an Interactive Surface", filed on Jun. 13, 2014, which is a continuation of International Patent Application No. PCT/CN2014/072961, entitled "System and Method for Identifying an Object's ID and Location Relative to an Interactive Board", filed on Mar. 6, 2014, which is a continuation in part to International Patent Application No. PCT/CN2014/071850, entitled "System and Method for Identifying an Object's ID and Location Relative to an Interactive Board", filed on Jan. 30, 2014.

The entire disclosures of each of the above applications are incorporated herein by reference.

TECHNICAL FIELD

The present invention relates to an RF antenna array for detecting an RFID tag. More specifically, the present invention relates to eliminating blind spot of a high frequency RF antenna array, allowing an RFID tag to be detected when placed anywhere on top of the RF antenna array that is within the communication range of the RF antenna array.

BACKGROUND

Radio frequency identification (RFID) technology has been used in a variety of applications such as tracking, security, transportation, retailing, industrial, and individual identification. Data communication via RFID technology may be used for detecting the presence of an object, identifying the object, or obtaining data associated with the object. In an RFID system, an RFID tag is attached to an object and communicates wirelessly with an RFID reader. The RFID reader typically drives a plurality of RF antennas to detect and identify RFID tags at different locations.

In passive RFID systems, the antenna of the RFID reader emits RF signals to activate passive RFID tags within a reading range. Once activated by the RF energy, the passive RFID tags are configured to transmit a responding signal to the RFID reader. The RFID tag obtains its energy through electromagnetic induction with the EM field generated by the RF antenna, and the communication range of the RFID tag is dependent on the intensity of the EM field. For an RF antenna in the shape of a square, since the electromagnetic wave radiates less effectively around its four corners, the intensity of the EM field is weak around the corners, and thus the RFID tag will be difficult to be detected and identified if it is placed in close proximity to any corners of the RF antenna.

Therefore, for an RF antenna array with multiple antennas, a "blind spot" is formed as a result at the area encompassing borders of multiple RF antennas in the array. The blind spot refers to an area on the surface of the RF antenna array, where an RFID tag fails to be detected. At the same time, an RFID tag placed elsewhere outside the blind spot within the effective communication range of the RF antenna array is detectable to the antenna array. Practically, there is usually a distance between the surface where the RFID tag is placed and the surface of the RF antenna array. Typically the bigger the distance is, the bigger the blind spot is.

The present invention provides to an apparatus and method for eliminating the blind spot in high frequency (13.56 MHz) RF antenna arrays.

SUMMARY OF INVENTION

The present invention provides an apparatus and method for eliminating the blind spot of a high frequency (13.56 MHz) RF antenna array, allowing an RFID tag to be detected when placed anywhere on top of the RF antenna array and within the general reading range of the antenna array.

In accordance with one embodiment of the present invention, the high-frequency RF antenna array includes a first array of RF antenna placed on a first surface, an RFID reader that is connected to the first RF antenna array, and a second RF antenna placed on a second surface. Without the second RF antenna, a blind spot would have formed at an area encompassing borders of multiple RF antennas of the first array. The second RF antenna is located directly below or above the blind spot of the first array, but not connected to any electrical path. The high-frequency RF antenna array further includes a processor operatively linked to the RFID reader.

In accordance with one embodiment of the present invention, once an RFID tag, of a smaller size than that of the antennas of the first RF antenna array, is placed on or near the surface area of the blind spot and yet detected by multiple antennas in the first RF antenna array that overlap the second RF antenna, the processor is configured to determine that the RFID tag has been placed on top of the second RF antenna even though the second RF antenna is not electrically connected to the RFID reader. This is in contrast to the situation whereby if the second RF antenna is removed, the RFID tag placed at the same place will fail to be detected. Therefore, this high-frequency RF antenna array design is capable of reading a passive RFID tag throughout the surface area of the array within the communication range of the antennas without a blind spot.

The present invention is useful in improving the RF communication range and accuracy of a passive RFID system.

DETAILED DESCRIPTION OF THE INVENTION

While the present invention will be described using specific embodiments, the invention is not limited to these embodiments. People skilled in the art will recognize that the system and method of the present invention may be used in many other applications. The present invention is intended to cover all alternatives, modifications and equivalents within the spirit and scope of invention, which is defined by the apprehended claims.

Furthermore, in the detailed description of the present invention, specific details are set forth in order to provide a thorough understanding of the present invention. However, it will be obvious to one of ordinary skill in the art that the present invention may be practiced without these specific details. In other instances, well known methods, procedures, components, and circuits are not described in details to avoid unnecessarily obscuring a clear understanding of the present invention.

The present invention may be better understood and its numerous objects and advantages will become apparent to those skilled in the art by reference to the accompanying drawings.

Figure 1:
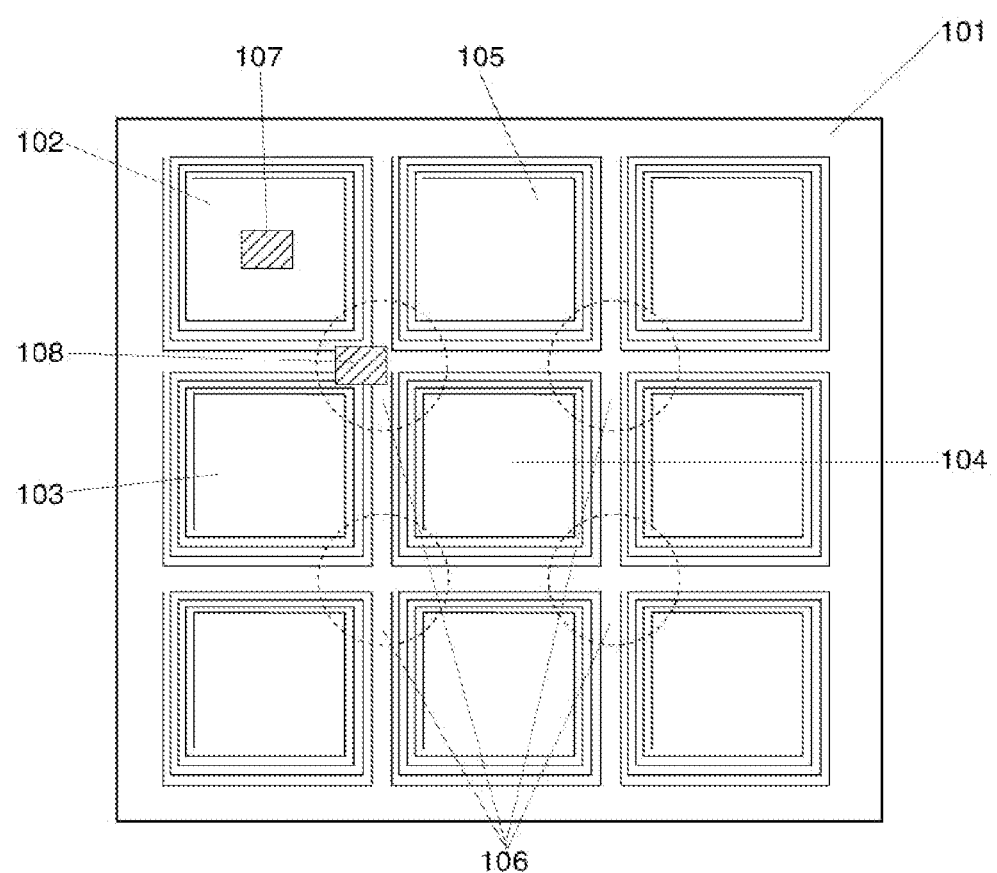
FIG. 1 is an exemplary schematic diagram illustrating the formation of the blind spot in an array of RF antennas in accordance with one embodiment of the present invention.

FIG. 1 is an exemplary schematic diagram illustrating the formation of the blind spot in an array of RF antennas in accordance with one embodiment of the present invention. As shown in FIG. 1, an array of RF antennas 101 is embedded on a surface. Referring to the four antennas 102, 103, 104, and 105 located at the top left corner of the array, one can see that these antenna designs are in the square shape and each are connected to an RF reader (not shown in FIG. 1). One representative size of the antenna is 62 mm×62 mm, and typically the distance between two adjacent RF antennas in the array is 2 mm. Once an RFID tag 107 is placed on top of antenna 102, its presence is detected and its location is identified by the RF antenna array. However, as explained previously, an RFID tag cannot be detected and identified by any RF antennas in the array if it is placed in close proximity to the corners of the RF antennas where the electromagnetic wave is not radiated effectively. For example, once an RFID tag 108 is placed at the area 106 encompassing borders of the four corners of the RF antennas 102, 103, 104, and 105, a blind spot of the antenna array is formed as a result. Those who are skilled in the art will recognize that blind spots can also occur in areas encompassing adjacent borders of multiple RF antennas in arrays of different arrangements from what is being presented in this figure. For example, a two dimensional array of RF antennas with each of the antenna being a hexagon will likely form a blind spot at the area encompassing the adjacent corners of three antennas. Similarly, if the antennas of the first array are deployed in a three dimensional, rather than two dimensional, surface, a blind spot is likely to form in the space that encompasses the corners of multiple antennas.

The present invention provides an apparatus and method for eliminating the blind spot in the first RF antenna array as illustrated in FIG. 1.

Figure 2A:
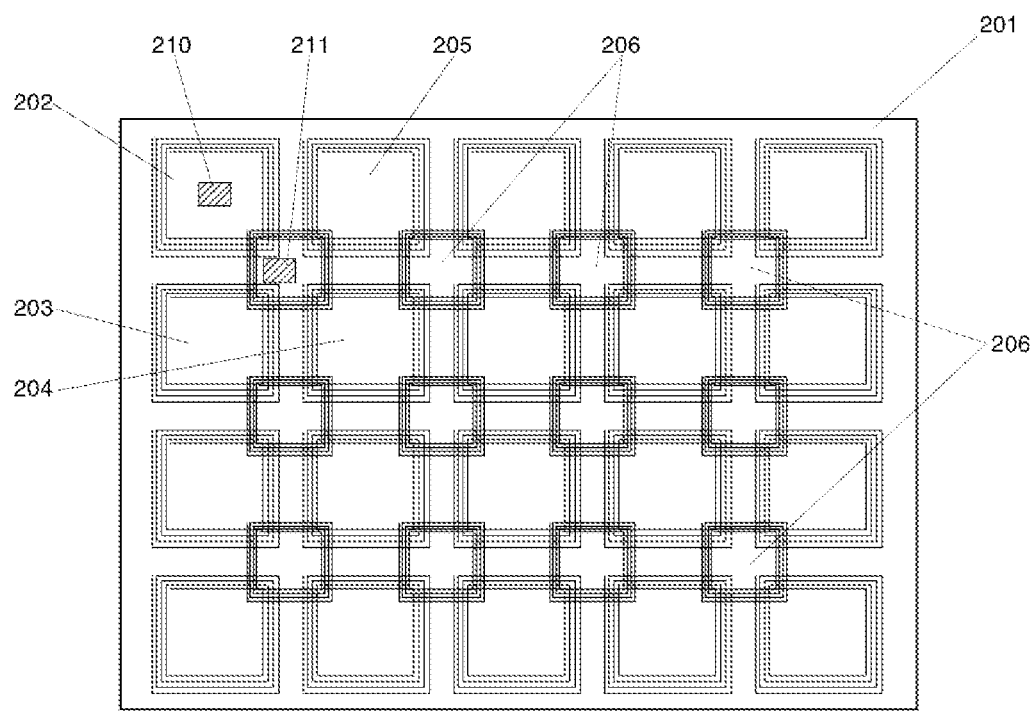
FIG. 2A is an exemplary schematic diagram of a birds-eye view of the high-frequency RF antenna array for reading a passive RFID tag in accordance with one embodiment of the present invention.

FIG. 2A is an exemplary schematic diagram of a birds-eye view of the high-frequency RF antenna array for reading a passive RFID tag in accordance with one embodiment of the present invention. As shown in FIG. 2A, the high-frequency RF antenna array 201 includes a first array of high-frequency RF antenna placed on a first surface, an RFID reader that is connected to the first RF antenna array, and a second RF antennas 206 placed on a second surface. The RF antenna array further includes a processor operatively linked to the RFID reader (not shown in FIG. 2A).

The first array consists of at least four RF antennas of squares in shape, e.g., antennas 202, 203, 204, and 205 located at the top left corner of the array. If an RFID tag 210 is placed on the surface area of the antenna array and detected only by antenna 202, the processor is configured to determine that the RFID tag has been placed on top of the antenna 202. As previously described in FIG. 1, however, a blind spot of the antenna array is formed as a result at the area encompassing borders of the four corners of the four RF antennas 202-205. Once an RFID tag 211 is placed on the blind spot, it is not detected by any of the four RF antennas 202-205.

The second RF antennas 206 are also squares in shape placed on a second surface, with each of them located directly below or above the area encompassing borders of four adjacent corners of four RF antennas in the first array. One representative size of the second RF antenna is 22 mm×22 mm, a smaller size relative to the first RF antenna array. The second RF antenna is not connected to any network or electrical path in any form. It consists of coils as well as electronic components such as electric capacitors and electric resistors. Therefore, an RFID tag cannot be detected by the second antenna independently because the second antenna is not operatively linked to the RF reader or the processor. However, through the electromagnetic induction with the EM field generated by the first RF antenna array, a second EM field, in an opposite direction to the EM field generated by the first RF antenna array, is generated by a second RF antenna. With the formation of the second EM field, the second RF antenna can reach the optimal resonance with the first RF antenna array and thus enables the detection and identification of the RFID tags placed on the second RF antenna by the RF antennas in the first array. Once an RFID tag is placed on the surface area of the RF antenna array and detected by multiple antennas in the first array, the processor is configured to determine that the RFID tag has been placed on top of the second RF antenna. Therefore, this high-frequency RF antenna array is capable of reading a passive RFID tag throughout the surface area of the array within the communication range of the antennas without a blind spot.

For example, if the RFID tag 211 is again placed on the surface area of the antenna array and detected by all of the four antennas 202-205, with the existence of a second antenna 206, the processor is configured to determine that the RFID tag has been placed on top of the second antenna 206, i.e., the area encompassing borders of the four adjacent corners of the four RF antennas 202-205. And this is in contrast to the situation whereby the RFID tag 211 placed at the same place will fail to be detected, if the second RF antenna 206 is removed, even though the second RF antenna 206 does not have electrical connection to the RFID reader. Those who are skilled in the art will recognize that this high-frequency RF antenna array is capable of reading a passive RFID tag throughout the surface area of the array within the communication range of the antennas without a blind spot.

Figure 2B:
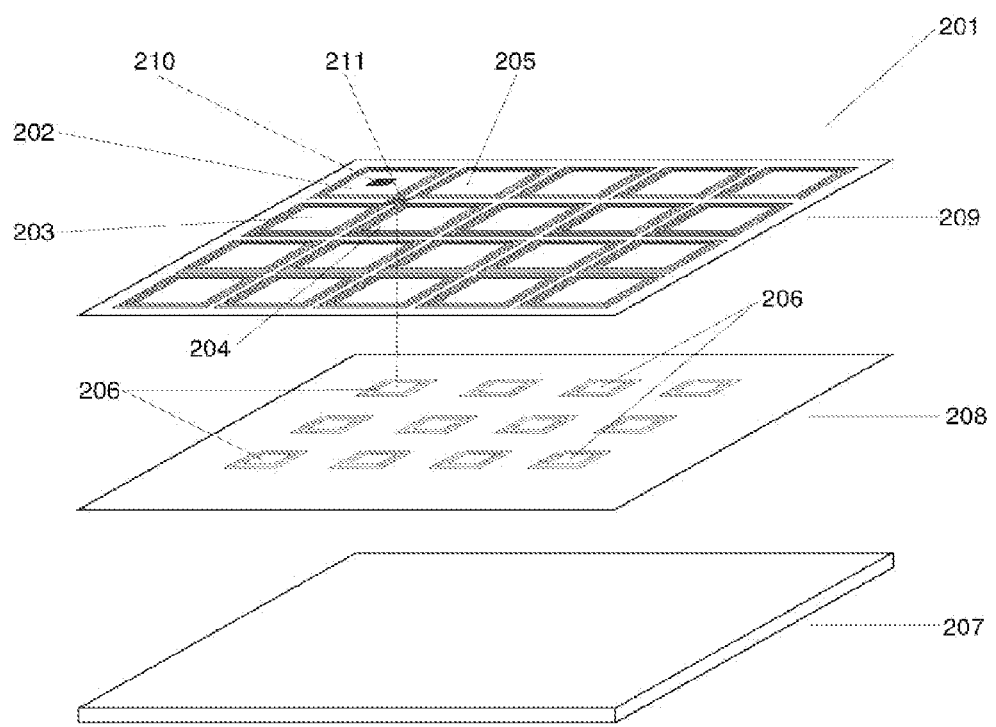
FIG. 2B is an exemplary schematic diagram of a cross-sectional view of the high-frequency RF antenna array with each layer separated for the purpose of illustration in accordance with one embodiment of the present invention.

FIG. 2B is an exemplary schematic diagram of a cross-sectional view of the high-frequency RF antenna array with each layer clearly spread for illustration sake in accordance with one embodiment of the present invention. Once can see in FIG. 2B that the bottom layer 207 is the substrate or base of the high frequency RF antenna array. The first surface 209 embedded with the first antenna array is placed above the bottom layer 207. In between the bottom layer 207 and the first surface 209 is the second surface 208 embedded with second RF antennas 206. Those who are skilled in the art will realize that the second surface 208 can also be on top of the first surface 209. Therefore, each of the second RF antennas 206 is positioned directly below or above a blind spot of the first array.

The invention claimed is:
1. A high-frequency RF antenna array for reading a passive RFID tag throughout the surface area of the array within the communication range of the RF antennas and without a blind spot, comprising a first array of RF antennas placed on a first surface, consisting of four RF antennas of larger squares in shape, resulting in a blind spot of the first array in an area of four adjacent corners of the RF antennas when detecting an RFID tag placed at a certain distance from the first surface but within the communication range of the four RF antennas of the first array, an RFID reader that is connected to the first array of RF antennas, a second RF antenna that is a smaller square in shape placed on a second surface, positioned directly below or above the blind spot of the first array, wherein the second RF antenna is not connected to any electrical path;

a processor operatively linked to the RFID reader, wherein the processor is configured to determine that the RFID tag has been placed on top of the second RF antenna upon the RFID tag having been detected by the four RF antennas in the first array.

2. A method of creating a high-frequency RF antenna array that is capable of reading a passive RFID tag throughout the surface area of the array within the communication range of the RF antennas and without a blind spot, comprising placing a first array of high-frequency RF antenna that consists of four RF antennas of larger squares in shape on a first surface, resulting in a blind spot of the first array in an area of four adjacent corners of the RF antennas when the first array of RF antennas detects an RFID tag placed at a certain distance from the first surface but within the communication range of the four RF antennas of the first array;

connecting the first array to an RFID reader;

placing a second RF antenna that is a smaller square in shape on a second surface, directly below or above the blind spot of the first array, wherein the second RF antenna is not connected to any electrical path;

detecting an RFID tag placed on top of the blind spot of the first array, by an RF antenna of the first array that is related to the blind spot;

determining, by a processor that is operatively linked to the RFID reader, that the RFID tag has been placed on top of the second RF antenna upon the RFID tag having been detected by the four RF antennas in the first array.

\* \* \* \* \*